US008860366B2

(12) United States Patent
Muller et al.

(10) Patent No.: US 8,860,366 B2
(45) Date of Patent: Oct. 14, 2014

(54) PLUG-IN ELECTRIC VEHICLE SUPPLY EQUIPMENT

(75) Inventors: Michael Muller, Harper Woods, MI (US); Garret Miller, Owatonna, MN (US); Charles K. Yankitis, New Baltimore, MI (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 339 days.

(21) Appl. No.: 12/772,519

(22) Filed: May 3, 2010

(65) Prior Publication Data
US 2011/0029146 A1 Feb. 3, 2011

Related U.S. Application Data

(63) Continuation-in-part of application No. 12/646,276, filed on Dec. 23, 2009.

(60) Provisional application No. 61/229,104, filed on Jul. 28, 2009.

(51) Int. Cl.
*H02J 7/00* (2006.01)
*B60L 11/18* (2006.01)
*B60K 1/00* (2006.01)

(52) U.S. Cl.
CPC ......... *B60L 11/1824* (2013.01); *B60L 2230/16* (2013.01); *Y02T 90/14* (2013.01); *Y02T 90/121* (2013.01); *Y02T 10/7088* (2013.01); *Y02T 10/6269* (2013.01); *B60L 11/1816* (2013.01); *Y02T 90/163* (2013.01); *Y02T 90/128* (2013.01); *B60L 2250/18* (2013.01); *Y02T 10/7005* (2013.01)
USPC .......................................... 320/109; 180/65.1

(58) Field of Classification Search
CPC .. Y02T 10/7088; Y02T 90/14; B60L 11/1824
USPC .......................................................... 320/109
See application file for complete search history.

(56) References Cited

U.S. PATENT DOCUMENTS 4,820,187 A 4/1989 May
5,462,439 A 10/1995 Keith
(Continued)

FOREIGN PATENT DOCUMENTS

WO 2010/055411 A1 5/2010

OTHER PUBLICATIONS

International Search Report & Written Opinion for PCT/US2012/040462, mailed Aug. 27, 2012.

(Continued)

*Primary Examiner* — Drew A Dunn
*Assistant Examiner* — Nathaniel Pelton
(74) *Attorney, Agent, or Firm* — Baker & Hostetler LLP

(57) ABSTRACT

A system for connecting an electric vehicle to a Level I or Level II power source. The system including an electric vehicle supply equipment (EVSE) having an electrical plug compatible with a Level I or Level II power outlet, the plug connected to a power cord. The power cord is connected to a housing containing a number of electrical components configured to control the power flow to an electric vehicle to recharge the vehicle's batteries, via either Level I or Level II. The power cord extends from the housing and is connected to a standard electric vehicle connector compatible with battery electric vehicles (BEV) and plug-in hybrid electric vehicles (PHEV). The EVSE further includes safety measures, such as a relay that controls the flow of power to the vehicle connector and a ground fault interrupter, to protect users from high voltage electric shocks.

21 Claims, 5 Drawing Sheets

(56) References Cited

U.S. PATENT DOCUMENTS

| | | | |
|---|---|---|---|
| 5,548,200 A | 8/1996 | Nor et al. | |
| 5,563,491 A * | 10/1996 | Tseng | 320/109 |
| 5,721,481 A * | 2/1998 | Narita et al. | 320/111 |
| 5,803,215 A | 9/1998 | Henze et al. | |
| 6,198,251 B1 | 3/2001 | Landon | |
| 6,316,908 B2 | 11/2001 | Kajiura | |
| 6,483,272 B1 | 11/2002 | Terada et al. | |
| 6,833,683 B2 * | 12/2004 | Winkler | 320/109 |
| 6,905,362 B2 | 6/2005 | Williams | |
| 6,951,206 B2 | 10/2005 | Kishimoto | |
| 7,253,584 B2 | 8/2007 | Souther et al. | |
| 7,254,468 B2 | 8/2007 | Pillar et al. | |
| 7,278,878 B2 | 10/2007 | Draggie et al. | |
| 7,690,453 B2 * | 4/2010 | Kinoshita et al. | 180/65.1 |
| 8,085,034 B2 | 12/2011 | Sirton | |
| 8,111,043 B2 | 2/2012 | Redmann | |
| 8,143,842 B2 | 3/2012 | Tyler et al. | |
| 8,151,916 B2 | 4/2012 | Gearhart | |
| 2006/0208699 A1 * | 9/2006 | Funabashi et al. | 320/128 |
| 2009/0313098 A1 | 12/2009 | Hafner et al. | |
| 2010/0017249 A1 | 1/2010 | Fincham et al. | |
| 2010/0174667 A1 * | 7/2010 | Vitale et al. | 705/412 |
| 2010/0241560 A1 | 9/2010 | Landau-Holdsworth et al. | |
| 2010/0268406 A1 | 10/2010 | Ito et al. | |
| 2011/0029146 A1 | 2/2011 | Muller et al. | |
| 2011/0055037 A1 * | 3/2011 | Hayashigawa et al. | 705/26.1 |
| 2011/0074351 A1 * | 3/2011 | Bianco et al. | 320/109 |
| 2011/0169447 A1 * | 7/2011 | Brown et al. | 320/109 |

OTHER PUBLICATIONS

International Search Report & Written Opinion for PCT/US2011/066380, prepared Jun. 13, 2012.

Robert Krause, et al., "Solid-State Relays Simplify Monitoring Electric-Car Battery Voltage," EDN, Feb. 19, 2004, 83-84.

International Search Report issued in PCT/US2013/043503 on Dec. 23, 2013.

* cited by examiner

PLUG-IN ELECTRIC VEHICLE SUPPLY EQUIPMENT

CROSS-REFERENCE TO RELATED APPLICATIONS

This application claims priority to and is a continuation-in-part of pending U.S. Non-Provisional application Ser. No. 12/646,276, filed Dec. 23, 2009, entitled "Plug-In Electric Vehicle Supply Equipment," which claims priority to U.S. Provisional Application No. 61/229,104, filed on Jul. 28, 2009, entitled "Plug-In Electric Vehicle Supply Equipment." This application also claims priority to U.S. Provisional Application No. 61/229,104, filed on Jul. 28, 2009, entitled "Plug-In Electric Vehicle Supply Equipment." The aforementioned applications are incorporated herein by reference in their entirety.

FIELD OF THE INVENTION

The present invention relates generally to providing power to recharge the batteries of battery electric vehicles and plug-in hybrid electric vehicles. More particularly, the present invention relates to electric vehicle power supply equipment to deliver Level I charging (up to 15 amps or 20 amps and 120 volts) and/or Level II charging (up to 80 amps and 240 volts) from an electrical socket.

BACKGROUND OF THE INVENTION

Vehicles powered either fully or partially by batteries must at some point recharge their batteries. Particularly in the case of battery electric vehicles, the lack of an alternative power source, like one that a plug-in hybrid electric vehicle would have, causes the batteries to deplete faster and have a more limited range. Plug-in electric hybrids are generally less taxing on the batteries and built-in regenerative systems may suffice to recharge the batteries enough to go longer without having to plug-in the vehicle to recharge it. However, the driver will dictate the need for recharging an electric vehicle through the extent of use, driving conditions, and driving style. High mileage, stop-and-go traffic, and quick accelerations are all things that the driver may subject an electric vehicle to, and all will deplete the batteries faster than under ideal conditions.

The standard American electrical socket provides 120 volts A/C (alternating current). The common availability of the 120 volt A/C electricity supply makes it a convenient choice for the power supply for recharging the batteries of electric vehicles. Many garages, carports, or outdoor parking areas may currently have 120 volt A/C electrical outlets, or may easily have one added, so that the power source may be connected to the electric vehicle for Level I charging.

However, the 120 volt A/C electricity supply is often insufficient to recharge the batteries of an electric vehicle in a period of time to allow for convenient use of the electric vehicle. A full recharge may not even be completed overnight and partial recharges often take too much time to be practical. Providing a higher voltage electricity supply can greatly reduce the amount of time needed to recharge an electric vehicle. Such high voltage sources are available in homes and other locations, and may be used for Level II charging.

It is desirable to provide a convenient way of connecting the Level I or Level II electricity source to an electric vehicle to recharge the batteries thereby making recharging quicker and using an electric vehicle more practical. It is also desirable to provide a convenient way to plug the electric vehicle supply equipment to either a Level I or Level II electrical supply source using plugs and receptacles designed to meet National Electrical Manufacturers Association (NEMA) standards, and with minimal duplication of components. This will reduce the cost of the product, installation, service repair, relocation and greatly simplifying the local electrical permitting process. This will also make the electric vehicle more practical, acceptable and provide a lower cost of ownership for the vehicle consumer.

SUMMARY OF THE INVENTION

At least in view of the above, it would be desirable to provide a system for connecting a high voltage electricity source to an electric vehicle to recharge its batteries. The foregoing needs are met, to a great extent, by certain embodiments of the present invention. According to one such embodiment of the present invention, an apparatus for connecting an electric vehicle to a high voltage power source includes a plug for use with a high voltage electrical socket attached to power conduit. The power conduit is further connected to a relay, a ground device or current monitor, a control circuit, and a vehicle connector conduit. A processor is connected to the control circuit for sending and receiving signals and data.

In one embodiment, an apparatus for connecting an electric vehicle to an electrical socket is provided and can include a socket connector configured to couple with the electrical socket, a power conduit connected to the socket connector and configured to convey a voltage from the electrical socket, a first power control device connected to the power conduit, a ground device connected to the power conduit, a control circuit connected to the power conduit and configured to generate signals corresponding to the voltage along the power conduit, a vehicle connector connected to the power conduit configured to connect to the electric vehicle, and a processor connected to the control circuit and configured to receive signals from and send signal to the control circuit.

In yet another embodiment, an apparatus for connecting an electric vehicle to a high voltage electrical power is provided and can include a socket connector configured to couple with a high voltage electrical socket that provides the high voltage electrical power, a power conduit connected to the socket connector and configured to convey the electrical power from the high voltage electrical socket, a control circuit connected to the power conduit and configured to generate signals corresponding to the electrical power along the power conduit, a vehicle connector connected to the power conduit configured to connect to the electric vehicle, and a processor connected to the control circuit and configured to receive signals from and send signal to the control circuit.

In still another embodiment, an apparatus for connecting an electric vehicle to a high voltage electrical socket is provided and can include means for coupling with the high voltage electrical socket, means for conveying a current from the high voltage electrical socket and is connected to the means for coupling, means for controlling current flow or magnitude along the means for conveying the current, means for interrupting the flow of current to prevent electric shock, means for generating signals corresponding to the current along the means for conveying the current, means for connecting to the electric vehicle and is connected to the means for conveying the current, and means for receiving signals from and sending signals to the means for generating signals, wherein the signals corresponding to the current along the means for conveying the current.

In a further embodiment, a method of charging an electrical vehicle is provided and include the steps of receiving a high electrical voltage from a power source, conducting the voltage from the power source to the electrical vehicle via a power conduit, controlling the current flowing on the power conduit with a switching relay, isolating a processor from the voltage with a control circuit, and cutting power to the electrical vehicle with a breaker circuit.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
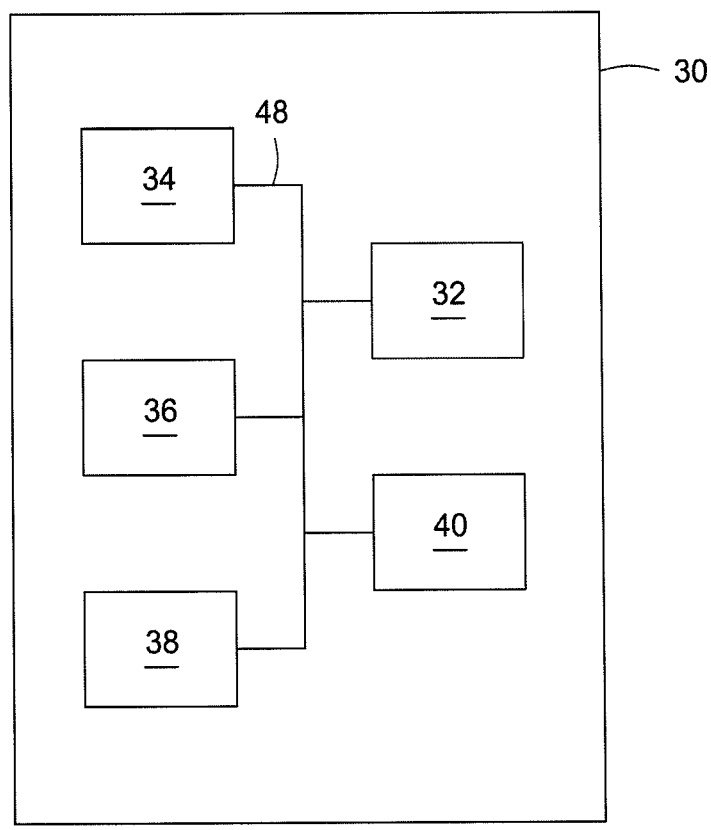
FIG. 1 is a block diagram view of an apparatus for connecting an electric vehicle to Level I or Level II power source according to an embodiment of the invention.

An embodiment of the present inventive system for connecting an electric vehicle, such as a battery electric vehicle (BEV) or a plug-in hybrid electric vehicle (PHEV), to a Level I or II power source may include an apparatus, such as an electric vehicle supply equipment (EVSE) for connecting the electric vehicle to a power source. The EVSE may be employed to make a circuit connection to allow power from an electrical socket, like a wall socket, to flow to a charging circuit within the electric vehicle. The wall socket may be a standard outlet found in a residential garage or a socket at a powering station outside the residential garage. The power station may be positioned, for example, at a parking garage, at a public parking space, at a rest stop, a conventional gas station, or a powering station (similar to a gas station, but has power stations instead of gas pumps). Further, the EVSE may be constructed to at least meet industry standards, such as SAE J1772, UL 2594, and NEC Article 625. The SAE J2836 vehicle communication standard may also be considered in constructing the EVSE.

The EVSE may have a socket connector at a first end to couple the EVSE to the electrical socket, such as a wall socket, and a vehicle connector at a second end to couple the EVSE to the electric vehicle. Once coupled, to both the wall socket and the vehicle, the EVSE may allow passage of electrical current from the wall socket to the electric vehicle, thus recharging the electric vehicles' batteries. This embodiment allows for the use of standard electrical outlets instead of hardwiring the EVSE directly to a power source.

Level I and Level II sockets are different in configurations. The EVSE may be constructed and/or provided with adapters to make the EVSE compatible with both a Level I and II socket. This may be accomplished through a combination of internal hardware and/or electrical components, external wiring components, and plug components and/or adapters.

In addition, the EVSE may analyze signals and/or data received from the electric vehicle. Analyzing the signals and/or data may involve checking the electric vehicle for specific conditions. While analyzing, the EVSE may determine when to allow and when to prohibit the flow of current between the socket and the electric vehicle.

The invention will now be described with reference to the drawing figures, in which like reference numerals refer to like parts throughout.

FIG. 1 is a block diagram view of an apparatus for connecting an electric vehicle to Level I or Level II power source according to an embodiment of the invention. An EVSE is one such apparatus and may include an input device 32, a memory 34, a communication device 36, a processor 38, and a display 40, some or all of which can be interconnected by a data link 48. The EVSE 30 can be a general computing device, such as a personal computer (PC), a UNIX workstation, a server, a mainframe computer, a personal digital assistant (PDA), a cellular phone, a smartphone, some combination of these or any other suitable computing device. Alternatively, the EVSE 30 can be a specialized computing device made up of components specifically chosen to execute the functionality of the EVSE 30. The remaining components can include programming code, such as source code, object code or executable code, stored on a computer-readable medium that can be loaded into the memory 34 and processed by the processor 38 in order to perform the desired functions of the EVSE 30.

The processor 38 may be executed in different ways for different embodiments of the EVSE 30. One embodiment is that the processor 38 is a device that can read and process data such as a program instruction stored in the memory 34 or received from a source on the electric vehicle. Such a processor 38 may be embodied by a microcontroller. On the other hand, the processor 38 may be a collection of electrical circuitry components built to interpret certain electrical signals and perform certain tasks in response to those signals, or an integrated circuit.

The memory 34 may include, for example, any form or combination of volatile, non-volatile, solid state, magnetic, optical, permanent, removable, writable, rewriteable, and read-only memory. The memory 34 may contain a number of program instructions for use with the EVSE 30. The instructions may include methods, for example, for controlling the flow of current between the electrical socket and the electric vehicle. These methods may include controlling when to allow or prohibit the flow of current, or perhaps moderate the flow of current. The flow of current can be controlled based on various factors such as when off peak rates of an electrical utility are in progress; the usage of power, for example, within a house, a building, a power grid, or a parking structure; the availability of current or if the current is constant; scheduled power outages; availability of raw materials that are used in generating electricity; the availability of alternative means of generating availability; the weather at the local charging station or outlet, which can effect means of generating electricity, such as wind mills, and solar panels and the like.

Further, the memory may contain software having instructions related to diagnosing vehicle functions, such as OBD-II, battery testing, tire pressure sensor testing, emissions testing and the like. Further, the software may include the ability to track the status of various batteries in the vehicles, such as which batteries have been replaced, the remaining battery life of the various batteries, the warranty information about the batteries, the type of batteries used in the vehicle (mix and match) and the like. Many other embodiments may provide for further methods, some of which will be discussed herein.

Additionally, an embodiment of the EVSE 30 can communicate information to a user through the display 40 and request user input through the input device 32 by way of an interactive, menu-driven, visual display-based user interface, or graphical user interface (GUI). The user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a scroll wheel, a touch screen or a voice-activated system.

Some options that may be selected through the input device 32 may allow the user control over the charging of the electric vehicle. The user may select, for example, that the batteries be charged to or at a certain level or for a certain amount of time, a certain number of charges or start and stop at a certain time or at a particular event. Further, the user may select to be notified on a separate device, like on a cellular device, smart phone, pager, fax, remote control/display, or other wired and wireless devices, that the electric vehicle or charging is in a certain state, such as complete or faulted. The user may be able to set the EVSE to control and power some of the vehicle's components while plugged in. For example, during different seasons the user may desire to heat or cool the vehicle as he gets ready for work in the morning so that the vehicle is comfortable when he gets in it. The EVSE may also control setting the radio, power seats and mirrors depending on user preferences. Through the use of the EVSE, other devices like a GPS, radar detector, and other devices that require boot or warm up periods may be powered on before the user enters the electric vehicle.

The display 40 may have a more simple implementation than previously mentioned, consisting of one or multiple indicators. Such indicators may consist of a small liquid crystal display (LCD) that can depict text or graphics. The LCD may be monochrome or colored. Other embodiments may include a single or multiple light emitting diodes (LED). This implementation could work for transmitting a limited number of simple messages. An LED may emit a single color of light, or it may be able to emit a number of different colors. Each LED or color may be associated with a different message. Some messages may include that power is available to charge the electric vehicle batteries, that charging the electric vehicle batteries is in progress, that the charging is complete, and that there is a fault or problem. The display may also be used to indicate the level of charge for the batteries, the number of times the batteries have been charged and the remaining charging time or the time the batteries have been charging.

The display 40 may also be separate from the EVSE or a second remote display can be utilized. The second remote display (not shown) can be a remote control panel that receives the same or similar information as the display 40. The second remote display can also control the EVSE in the same or similar manner as the display 40 or the input device 32.

Figure 2A:
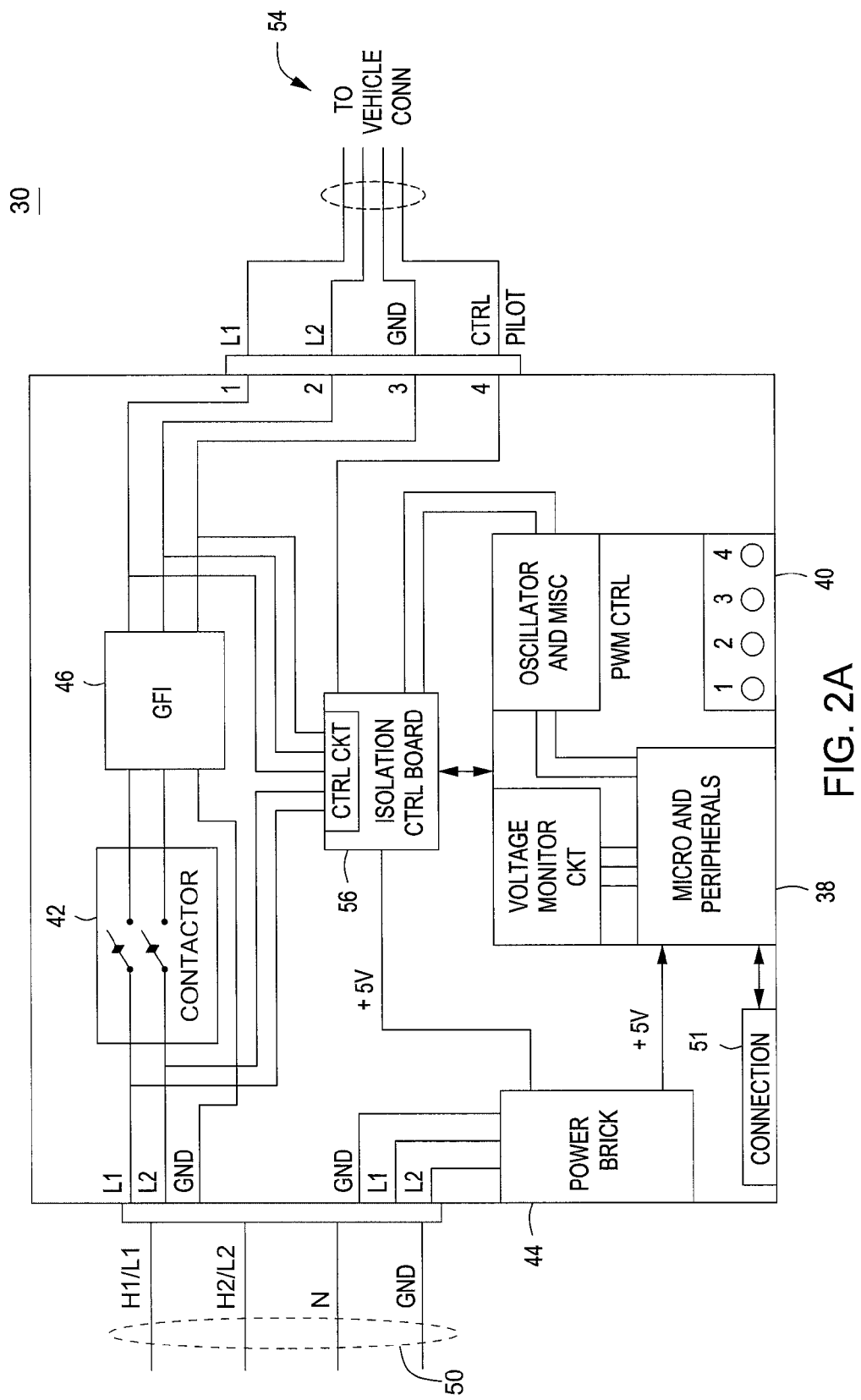
FIG. 2A is a schematic view of an apparatus for connecting an electric vehicle to a high voltage power source according to another embodiment of the invention.
Figure 2B:
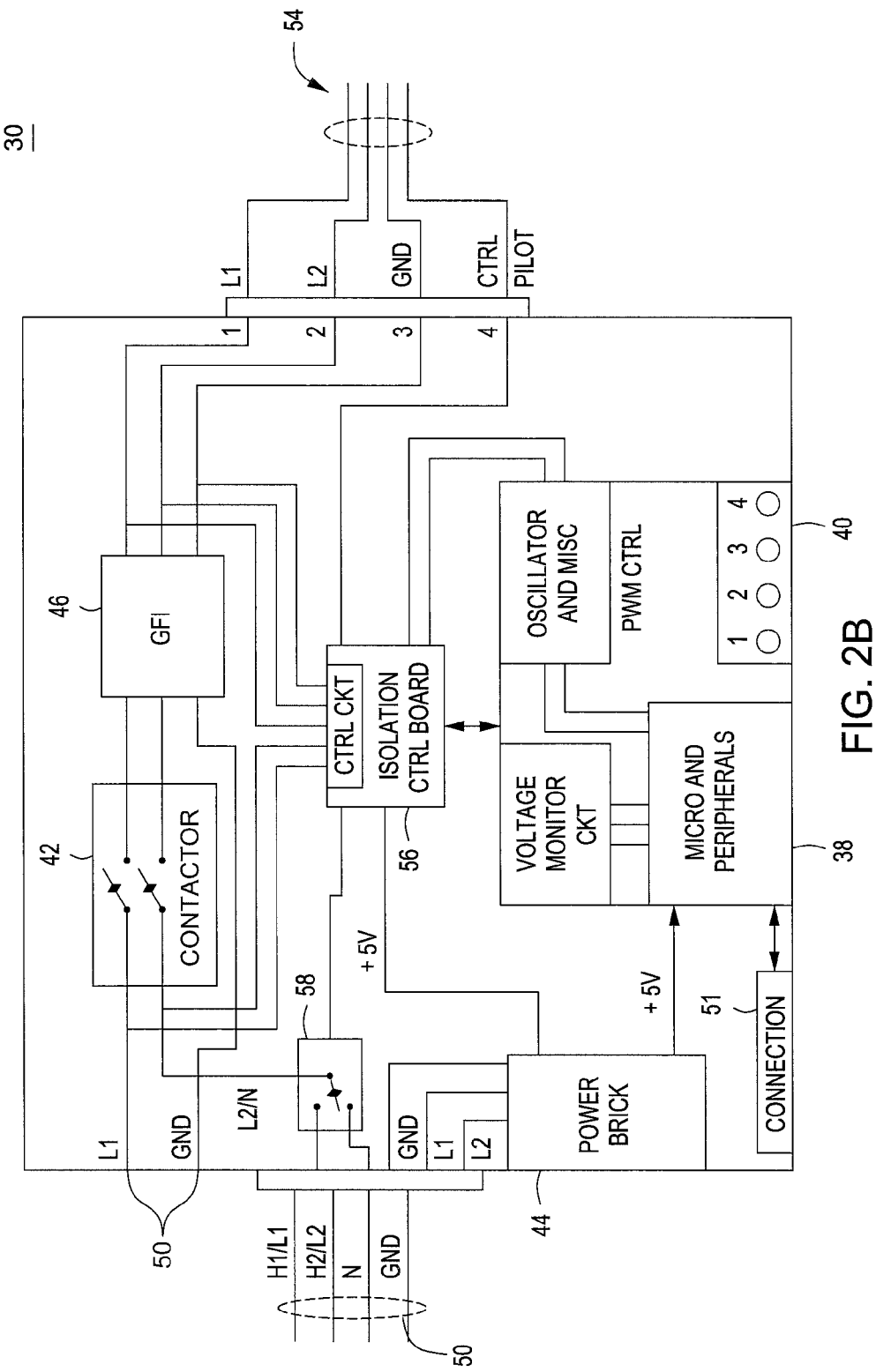
FIG. 2B is a schematic view of an apparatus for connecting an electric vehicle to a Level I or Level II power source according to another embodiment of the invention.
Figure 2C:
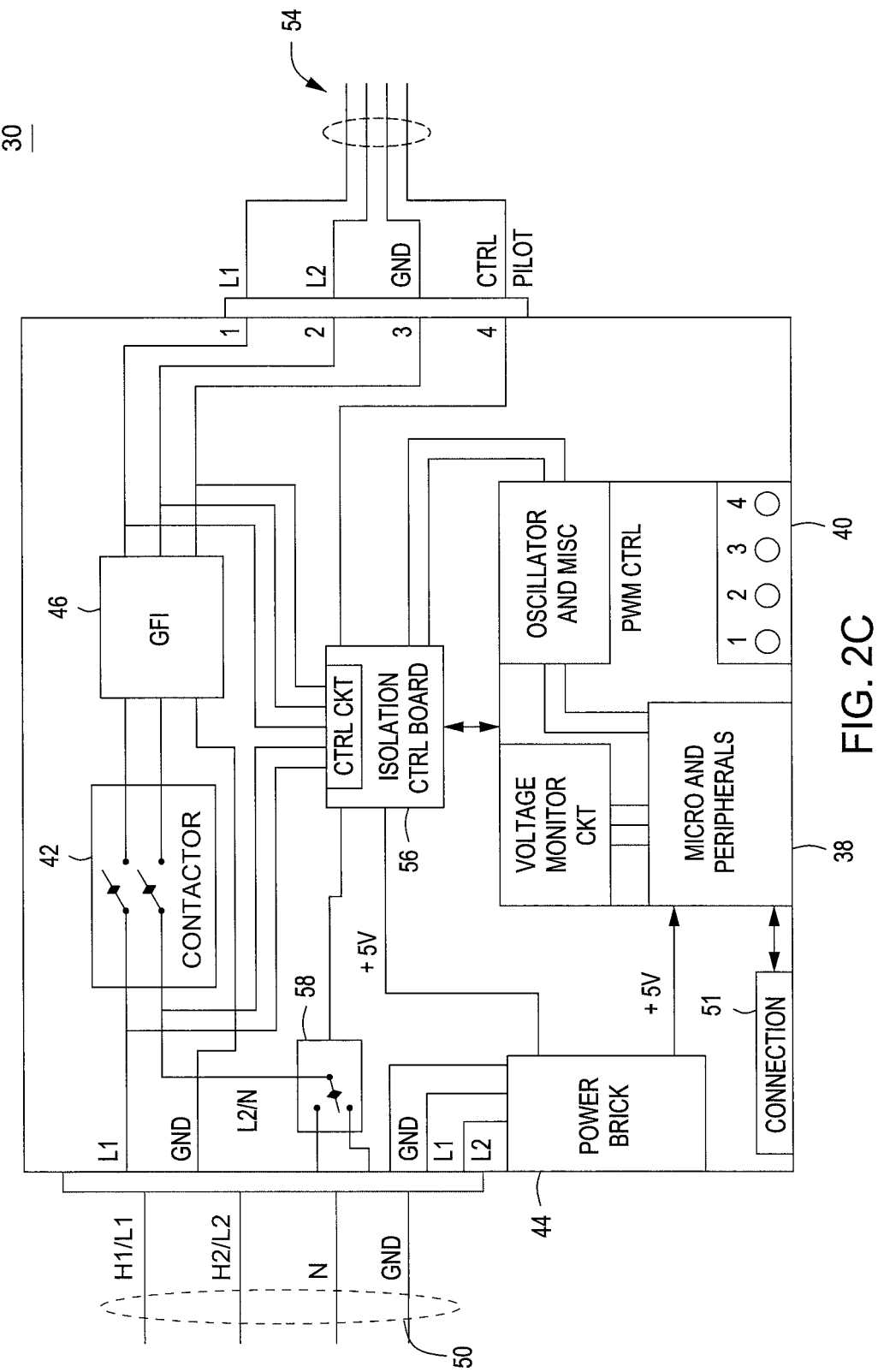
FIG. 2C is a schematic view of an apparatus for connecting an electric vehicle to a Level I or Level II power source according to another embodiment of the invention.

FIG. 2A is a schematic view of an apparatus for connecting an electric vehicle to a high voltage power source according to another embodiment of the invention. FIGS. 2B and 2C are schematic views of apparatuses for connecting an electric vehicle to a Level I or Level II power source according to other embodiments of the invention. The EVSE 30 may further include a relay 42 (contactor), a voltage regulating device 44, a breaking device 46, and a switch 58 (not shown in FIG. 2A), some or all of which may be connected by an electric conduit 50. A control circuit 56 may act as a buffer between different parts of the EVSE 30. At one end of the EVSE is a socket connector 52 (FIG. 3) and at the other end is a vehicle connector 54 (explained below).

The voltage regulating device 44 may be needed to power the electronic components of the EVSE 30. Since the EVSE 30 may draw its power from the same electrical socket it uses to charge the batteries of the electric vehicle, the EVSE 30 will be receiving high voltage electricity. The electrical socket may supply, for example 120 volts, 220 volts or 240 volts. The high voltage of the power drawn from the electrical socket could damage some of the electronic components of the EVSE 30. Thus, the voltage regulator device 44, such as a transformer or a voltage regulator, may be employed between to the electrical socket and the electrical components of the EVSE 30. The voltage may then be lowered to a level that is manageable to the electrical components, such as, for example, 5 volts or 12 volts. In other embodiments, the voltage regulator device 44 can increase the voltage as needed by the EVSE 30.

While the voltage regulating device 44 may regulate the voltage to parts of the EVSE 30, there are parts where electricity may flow unaltered from the electrical socket to the electric vehicle. An electric conduit may run the length of the EVSE 30.

In one embodiment of the invention, the electric conduit 50 may be of the type having a gauge and/or rating such that it may appropriately handle the range of supplied current from the electrical socket. That being, the electric conduit 50 should be able to handle at least the highest supplied current, and in turn it will also be able to handle lower levels of current. The electric conduit 50 may be one appropriate for handling Level I and Level II charging or any level of charging. The electric conduit 50 suited for Level 2 charging may be comprised of a combination of conduits including, for example, two conduits for power supply (L1 and L2), one conduit as a neutral, and one conduit as a ground. The supplied current may be split over L1 and L2, thus aiding in supplying the proper current for Level I and Level II charging.

In connecting the electric conduit to the internal components of the EVSE 30, it may be convenient to connect some or all of the combination of conduits that make up the electric conduit 50 to the different internal components. For example, the voltage regulating device 44, as discussed above, receives power from the supplied power from the electrical socket the EVSE 30 connects to. To receive this power, the voltage regulating device 44 may be connected to, at least, L1 and/or L2.

In one embodiment, the electric conduit 50 includes a relay 42 that may be placed to bridge segments of the electric conduit 50, allowing the EVSE 30 to start and stop the flow of current to the electric vehicle. The electric conduit 50 may optionally be connected to a voltage regulator to step up or step down the voltage passed to the electric vehicle. Further, to aid in providing the proper current to charge the electric vehicle, it is possible to provide the relay 42 with some or all of the current provided by the electrical socket. Power supply conduits L1 and L2 may both be connected to the relay 42. Alternatively, the relay 42 may be connected to only either conduit L1 or L2.

In an alternative embodiment, it may be that when only connected to conduit L1 or L2, the relay 42 may only enable the EVSE 30 to be able to provide the vehicle with Level I charging capabilities. Thus, to enable the EVSE 30 to provide Level II charging capabilities, as well as Level I charging, it maybe a possible to provide a switch 58 that will allow the EVSE 30 to selectively connect the unconnected conduit, either L1 or L2, to the relay 42. In one embodiment, the switch 58 may be connected to, at least, the conduit, either L1 or L2, not already connected to the relay 42. Further, the switch 58 may be connected to the control circuit 56 that controls when the switch allows for the selective connection of the unconnected conduit, either L1 or L2, to the relay 42. The control function will be discussed below.

Also connected to the electric conduit 50 may be a breaking device 46 (also called a ground device or a current monitor). The breaking device 46 is intended to cut power along the electric conduit 50 quickly so as to avoid harming a user with a high voltage electric shock, harming the components of the EVSE or damaging the electric vehicle. Such a breaking device 46 may be a ground fault interrupter. If the breaking device 46 trips and cuts power, EVSE 30 may have an auto-reset function to attempt to restore the power transfer to the electric vehicle. The auto-reset function may attempt to restore the power transfer after a determined time and/or for a determined number of tries. The auto-reset functions allows for continuous charging of the vehicle should a power surge occurs while the user is asleep or away from the charging location.

The control circuit 56 may be connected to the electric conduit 50 and to the data link 48. Acting as a buffer between two portions of the EVSE 30, the control circuit may pass signals from the electric conduit 50 representing the voltage on the electric conduit 50 to the processor 38. From these signals, the processor 38 may react accordingly to control the relay 42 and the breaking device 46. Further, the processor 38, and other components, such as a voltage monitor, an oscillator, and a pulse width modulator may act accordingly to conduct a number of functions of the EVSE 30. The control circuit 56 may also be connected to the voltage control device 44 for power, and a control pilot pin of a vehicle connector (discussed below) to pass on signals from the vehicle to the other components of the EVSE 30.

In the switch's 58 initial state, it will be open, thereby causing a disconnect between the unconnected conduit, either L1 or L2, and the relay 42. When the EVSE 30 is connected to a Level I electrical socket, the control circuit 56 would recognize that there exists a 120 volt drop between the powered conduit, either L1 or L2, and the neutral conduit of the electric conduit 50 and leave the circuit between the unconnected conduit, either L1 or L2, and the relay 42 open. Alternatively, when the EVSE 30 is plugged into a Level II electrical socket, then the control circuit 56 would recognize the power on the unconnected conduit and, either via a signal from the processor 38 or via logical circuitry, provide a signal to the switch 58 to close the circuit between the unconnected conduit and the relay 42. With the circuit closed, the relay 42 is connected to both power supply conduits, L1 and L2, of the electric conduit 50, and the EVSE 30 can provide the electric vehicle with Level II charging capabilities.

The EVSE also includes peripheral connection 51 that can add additional functionality to it, including USB, Fire-Wire, card reader, vehicle connector interface (for OBD-II, and the like connections), CD, DVD, memory, wireless communication, and additional hardware and software. The EVSE's software can be updated via the peripheral connection 51. Additional hardware can be added to include, for example, additional processor, memory, FPGA (field programmable gate array), ASIC, pin connections, multiplexor and the other hardware to expand the functionality of the EVSE.

Figure 3:
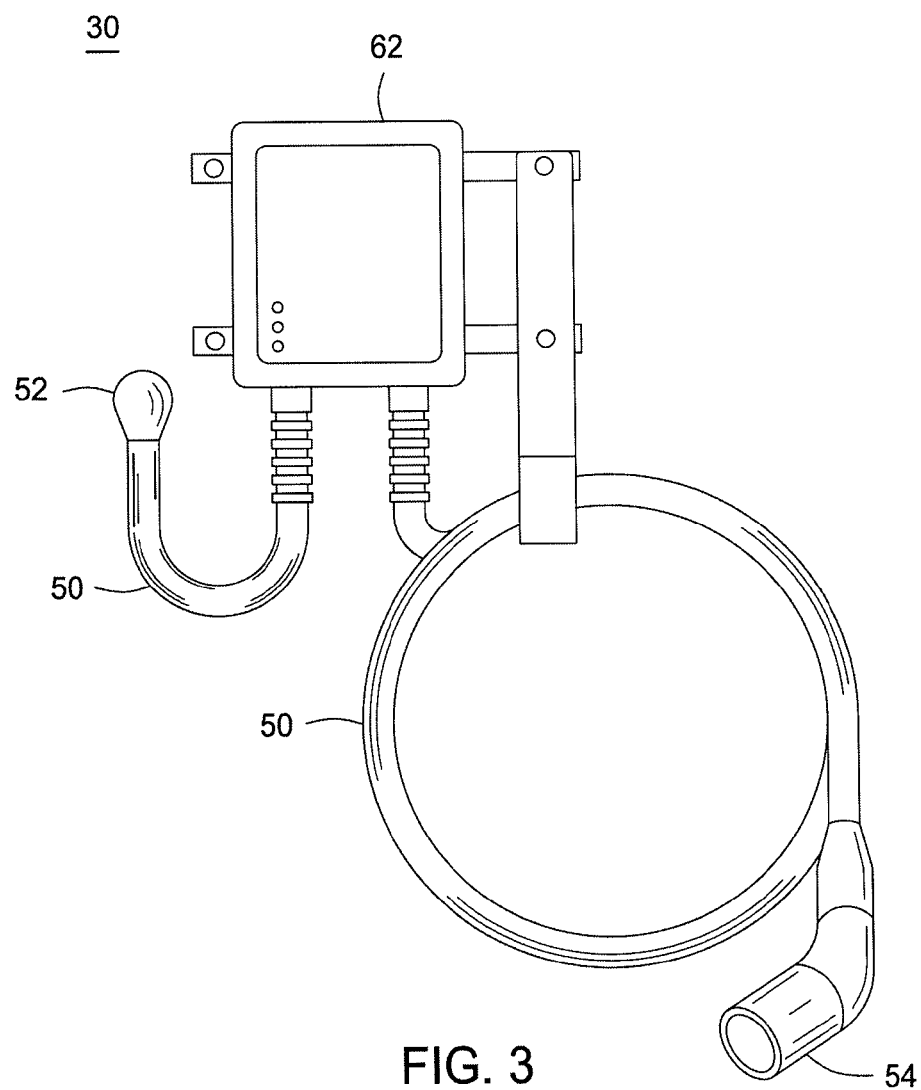
FIG. 3 is an elevation view of an apparatus for connecting an electric vehicle to a Level I or Level II power source according to another embodiment of the invention.

FIG. 3 is an elevation view of an apparatus for connecting an electric vehicle to a Level I or Level II power source according to another embodiment of the invention. Attached to a respective end of the electric conduit 50 may be the socket connector 52 and the vehicle connector 54. The socket connector 52 may couple with the electrical socket to allow electricity to flow to the EVSE 30. Any of a number of available or proprietary connectors may be used for the socket connector 52. Such available connectors may include a NEMA 5 plug, for example, a NEMA 5-15 plug for Level I charging, or a NEMA 14 plug, for example, a NEMA 14-50P plug for Level II charging, if appropriate for the electrical socket. These socket connectors 52 may be interchangeable. Alternatively, the socket connector may be of an appropriate type for Level I or Level II charging, and an adapter 60 may be used to adapt the socket connector 52 to work for the other type of charging, as discussed below. Connected to the opposite end of the electric conduit 50 may be the vehicle connector 54, which also may be any number of available or proprietary connectors. One such example of a vehicle connector 54 may be a five-pin connector including two power pins, a ground pin, a control pilot pin, and a proximity sensor pin as specified in the SAE standard J1772 and designed by Yazaki of North America.

The EVSE 30 may include a housing 62. The housing 62 may encase a number of the components of the EVSE 30, for example, all the components previously mentioned except for portions of the electric conduit 50, the socket connector 52 and the vehicle connector 54. A bracket may be attached to the housing 62 to mount the housing 62 on a vertical surface such as a wall or post. The housing 62 or bracket may further include a hook to hang the power conduit 50. Alternatively, the power conduit may be retractable into the housing 62.

The EVSE 30 may be available for both indoor and outdoor applications. Proper weather proofing may be part of the housing to protect the components from damage and the users from injury. Some outdoor installations of the EVSE 30 may include burial in the ground, being attached to a post, or integrated into a pedestal.

Figure 4:
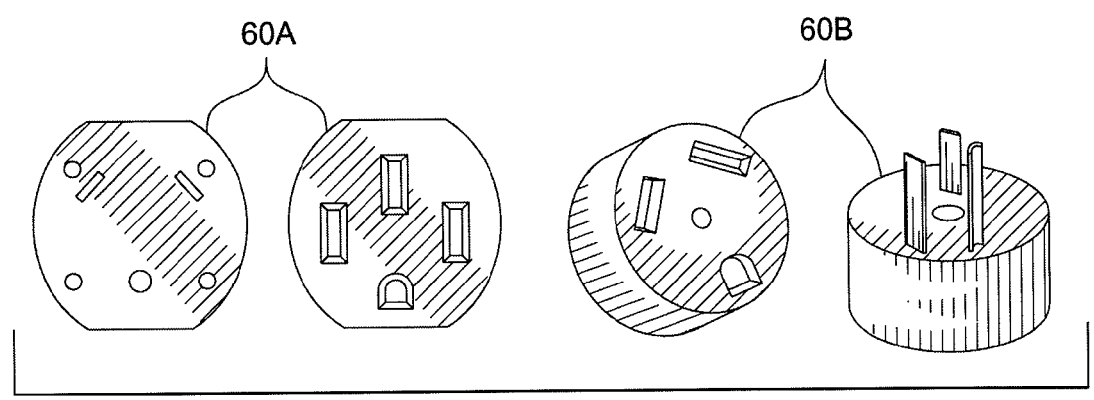
FIG. 4 illustrates adapters for connecting an apparatus that connects to a Level I or Level II power source according to another embodiment of the invention.

FIG. 4 illustrates adapters 60A and 60B for connecting an apparatus that connects to a Level I or Level II power source according to another embodiment of the invention. If the socket connector 52 is, for example, a NEMA type 5 plug suitable for Level I charging is at the end of the electric conduit 50, and it is desired to plug the EVSE 30 into a Level II socket, then the adapter 60A is configured to accept the prongs of the socket connector 52 (with NEMA type 5 plug) and has prongs configured to be inserted into a Level II socket. Alternatively, if the socket connector 52 is, for example, a NEMA type 14 plug suitable for Level II charging is at the end of the electric conduit 50, and it is desired to plug the EVSE 30 into a Level I socket, then the adapter 60B is configured to accept the prongs of the socket connector 52 (with NEMA type 14 plug) and has prongs configured to be inserted into a Level I socket. An example of an adapter 60B that would allow for connecting the socket connector 52 configured to connect to a Level II socket to connect to a Level I socket is the Marinco 50 A to 15 A RV Pigtail Adapter 150SPPRV.

Referring back to FIG. 1, in various embodiments, the EVSE 30 can be coupled to a communication network. The communication network allows for communication between the EVSE 30 and a remote device. The EVSE 30 can be coupled to the communication network by way of the communication device 36 which in various embodiments can incorporate any combination of devices—as well as any associated software or firmware—configured to couple processor-based systems. Such communication devices 36 may include modems, network interface cards, serial buses, parallel buses, LAN or WAN interfaces, wired, wireless or optical interfaces, and the like, along with any associated transmission protocols, as may be desired or required by the design.

The communication network links the communication device 36 of the EVSE 30 with the remote device. Various embodiments of the communication network may include any viable combination of devices and systems capable of linking computer-based systems, such as USB; Bluetooth; WiFi; ZigBee; power line communication (PLC); home area network (HAN); Silver Spring network; stable election protocol (SEP); the Internet; TCP/IP; an intranet or extranet; a local area network (LAN); a wide area network (WAN); a direct cable connection; a private network; a public network; an Ethernet-based system; a token ring; a value-added network; a telephony-based system, including, for example, T1 or E1 devices; a cellular telephony system, for example, GPRS or GSM; an Asynchronous Transfer Mode (ATM) network; a wired system; a wireless system; an optical system; a combination of any number of distributed processing networks or systems or the like.

The remote device may be a common remote device, such as a electronic control unit of a vehicle, an example of which often used in vehicles for receiving diagnostic signals such an OBD-II signals. The remote device may also be a proprietary remote device, such as one developed for use with a specific brand of engine or specific model of engine. Further embodiments may encompass the remote device being a data receiver for a tire pressure management system. In either of these cases, the communication device 36 may be able to connect with a dealer, manufacturer, service department, government entity such as a state inspection office, etc. and report the findings transmitted from the remote device.

Moreover, the remote device may be a wireless device with a display that gives the user information about the status of the electric vehicle connected to the EVSE 30. The remote device may be such that it is easily placed within a room in a building, or even attached to a key like a key chain. The information delivered to the user may include charge status of the vehicle, diagnostic messages, tire pressure management system messages, and other vehicle related information.

The EVSE 30 may also act as a remote control allowing the user to control function of the car, like power, air conditioning and heat, radio settings, power seat and mirror settings, etc. The EVSE 30 may also have internet access or similar communication access to remote server in order to obtain information such as emails, weather report, web pages, stock information, diagnostic databases and the other information.

The communication device 36 may also be able to communicate with the local utility company. This may allow for the utility company to know that the vehicle in connected and to charge the vehicle at a certain time of the day, such as during off-peak hours, if requested by the user. One embodiment to implement this feature is through the remote device, where the remote device encompasses a smart meter or a computerized utility meter. The EVSE 30 may communicate with the smart meter to determine when the EVSE 30 should charge the vehicle depending on certain parameters. If it is a goal to reduce energy costs, the smart meter may determine at what time of the day the rate for electricity is lowest, and during that time, tell the EVSE 30 to charge the vehicle. The EVSE 30 may also communicate with the smart meter to indicate when the vehicle is charging and how much charging is required. With this information the smart meter may be able to manage the power consumption of the rest of a house to keep overall power consumption at or below a desired level.

Other embodiments of the EVSE 30 may allow for multiple power conduits 50, each with its own vehicle connector 54. The EVSE 30 may charge the vehicles simultaneously or switch from one vehicle to another after the first vehicle has completed recharging. There may also be an adapter that allows the socket connector to connect to low voltage sockets, such as ones that provide 120 volts or less, as discussed herein. In other embodiments, the EVSE 30 can connect to alternative power sources that use renewable energy to charge the vehicle. Such sources may include solar panels and wind turbines, for example. If the alternative power sources alone are insufficient, then they may be supplemented by an electrical socket connected to a utility company source.

As stated above, the EVSE may potentially perform a variety of other functions in addition to its primary purpose of charging the electric vehicle. Multiple embodiments may also include any number of functions that may be considered secondary purposes of the EVSE. A few examples of these functions may include conducting battery tests and reporting the state of the batteries and the number of times the batteries have been charged. The EVSE may also conduct vehicle diagnostics, execute a tire pressure management system, run an emissions analysis, etc.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for connecting an electric vehicle to an electrical socket and for selectively receiving and delivering either level I voltage or level II voltage, comprising:
   a first socket connector configured to couple with the electrical socket providing either level I voltage or level II voltage;
   a power conduit having a first end connected to the first socket connector and configured to convey a voltage from the electrical socket to the electric vehicle, the power conduit configured to deliver either the level I voltage or the level II voltage;

a relay placed inline with the power conduit and configured to control voltage along the power conduit;

a control circuit connected to the power conduit and configured to generate signals corresponding to the voltage along the power conduit, wherein the signals indicate whether the voltage is the level I voltage or the level II voltage;

a switch connected to the power conduit and the relay, the switch being configured to be controlled by the control circuit in order to provide the level I or the level II voltage to the electric vehicle depending on whether the control circuit indicates the voltage is the level I voltage or the level II voltage;

a vehicle connector connected to a second end of the power conduit and configured to connect to the electric vehicle to provide one of the level I voltage and the level II voltage;

a processor connected to the control circuit and configured to receive signals from and send signals to the control circuit;

a voltage monitor connected to the processor; and a display connected to the processor, wherein the level I voltage comprises a nominal 120 Volts A/C and the level II voltage comprises a nominal 240 Volts A/C.

2. The apparatus of claim 1 further comprising a voltage regulator configured to step up or step down the voltage received from the power conduit in order to power the components of the apparatus.

3. The apparatus of claim 1 further comprising a ground fault interrupter that is disposed between the relay and the vehicle connector.

4. The apparatus of claim 1, wherein the power conduit further comprises at least two power supply conduits.

5. The apparatus of claim 1 further comprising:
a pulse width modulator connected to the processor.

6. The apparatus of claim 1, wherein the first socket connector is interchangeable with a second socket connector, the first socket connector designed to connect to the level I voltage source and the second socket connector is designed to connect to the level II voltage source.

7. The apparatus of claim 1 further comprising an adapter conductively connectable to the first socket connector and configured to connect the first socket connector to a different type of electrical socket.

8. The apparatus of claim 1 further comprising a housing containing a portion of the power conduit, the relay, the control circuit, the switch, and the processor.

9. The apparatus of claim 1, wherein the control circuit monitors voltage on the power conduit and determines if there is a level II voltage present and controls the switch so that the vehicle can receive level II voltage.

10. An apparatus for connecting an electric vehicle to an electrical socket and for selectively receiving and delivering either level I voltage or level II voltage, comprising:

a first connecting means configured to couple with the electrical socket to provide either the level I voltage or the level II voltage;

a power conducting means having a first end connected to the first connecting means and configured to convey a voltage from the electrical socket to the electric vehicle, the power conducting means being configured to deliver the level I voltage and the level II voltage;

a relaying means placed inline with the power conducting means and configured to control voltage along the power conducting means;

a controlling means connected to the power conducting means and configured to determine the voltage along the power conducting means;

a switching means connected to the power conducting means and the relaying means, the switching means is controlled by the controlling means in order to provide the level I or the level II voltage to the electric vehicle depending on whether the controlling means determines the voltage is the level I voltage or the level II voltage;

a second connecting means connected to a second end of the power conducting means and configured to connect to the electric vehicle to provide one of the level I voltage and the level II voltage;

a processing means connected to the controlling means and configured to receive signals from and send signals to the controlling means;

a voltage monitoring means connected to the processing means; and a display means connected to the processing means, wherein the level I voltage comprises a nominal 120 Volts A/C and the level II voltage comprises a nominal 240 Volts A/C.

11. The apparatus of claim 10 further comprising a voltage regulating means configured to step up or step down the voltage received from the power conducting means in order to power the components of the apparatus.

12. The apparatus of claim 10 further comprising an interrupting means that is disposed between the relaying means and the second connecting means.

13. The apparatus of claim 10, wherein the power conducting means further comprises at least two power supply conduits.

14. The apparatus of claim 10 further comprising:
a modulating means connected to the processing means.

15. The apparatus of claim 10, wherein the first connecting means is interchangeable with a third connecting means, the first connecting means designed to connect to the level I voltage source and the third connecting means is designed to connect to the level II voltage source.

16. The apparatus of claim 10 further comprising an adapting means conductively connectable to the first connecting means and configured to connect the first connecting means to a different type of electrical socket.

17. The apparatus of claim 10 further comprising a housing means configured to contain a portion of the power conducting means, the relaying means, the controlling means, the switching means, and the processing means.

18. The apparatus of claim 10, wherein the controlling means monitors voltage on the power conducting means and determines if there is a level II voltage present and controls the switching means so that the vehicle can receive level II voltage, if available.

19. A method of charging an electrical vehicle in order to selectively receive and deliver either level I voltage or level II voltage to the electric vehicle, comprising the steps of:

receiving an electrical voltage from a power source comprising either the level I voltage or the level II voltage;

conducting the voltage from the power source to the electrical vehicle via a power conduit;

controlling the voltage flowing on the power conduit with a first switching relay;

monitoring the power conduit with a control circuit to determine if the power source is providing power at a low level or at a greater level;

allowing greater power to flow on the power conduit with a second switch relay when the greater power level is available when the monitoring determines the power source is providing power at the greater power level; and allowing the low power to flow on the power conduit with the second switch relay when the low power level is available when the monitoring determines the power source is providing power at the low power level receiving signals and sending signals with a processor associated with the control circuit;

monitoring the voltage with a voltage monitor connected to the processor; and displaying with a display connected to the processor, wherein the low power level comprises the level I voltage that comprises a nominal 120 Volts A/C and the greater power level comprises the level II voltage that comprises a nominal 240 Volts A/C.

20. The method of charging of claim 19, wherein the first and second relays are controlled by a control circuit based on the step of monitoring.

21. The method of charging of claim 19, further comprising:

adapting a connection to the power source if a plug on a power connector and a socket of the power source are mismatched, wherein the adapting step is done with an adaptor that adapts the plug regardless of configuration to be received by the socket of the power source.

* * * * *